US011992966B2

(12) United States Patent
Wombacher et al.

(10) Patent No.: US 11,992,966 B2
(45) Date of Patent: May 28, 2024

(54) METHOD FOR CONTOUR PUNCHING AN OUTPUT STACK AND PUNCHING DEVICE

(71) Applicant: Adolf Mohr Maschinenfabrik GmbH &Co. KG, Hofheim am Taunus (DE)

(72) Inventors: Michael Wombacher, Darmstadt (DE); Frank Seidel, Dreieich (DE)

(73) Assignee: Adolf Mohr Maschinenfabrik GmbH &Co. KG, Hofheim am Taunus (DE)

( * ) Notice: Subject to any disclaimer, the term of this patent is extended or adjusted under 35 U.S.C. 154(b) by 0 days.

(21) Appl. No.: 17/692,245

(22) Filed: Mar. 11, 2022

(65) Prior Publication Data

US 2022/0288803 A1 Sep. 15, 2022

(30) Foreign Application Priority Data

Mar. 11, 2021 (EP) .................................... 21162102

(51) Int. Cl.
*B26F 1/44* (2006.01)
*B26D 7/00* (2006.01)

(52) U.S. Cl.
CPC ........ *B26F 1/44* (2013.01); *B26D 2007/0018* (2013.01); *B26F 2001/4481* (2013.01); *B26F 2210/02* (2013.01)

(58) Field of Classification Search
CPC .. B26F 2210/02; B26F 1/40; B26F 2001/407; B26F 1/44; B26F 2001/4481; B26F 1/46; B26F 2001/4472; B26D 7/0675; B26D 7/18; B26D 2007/0018; G09F 3/10
See application file for complete search history.

(56) References Cited

U.S. PATENT DOCUMENTS

| | | | | |
|---|---|---|---|---|
| 5,768,963 A * | 6/1998 | Bruehwiler | B26D 7/025 | 83/123 |
| 2002/0189416 A1* | 12/2002 | Gross | B26D 7/18 | 83/418 |
| 2015/0352741 A1* | 12/2015 | Nabity | B26F 1/44 | 83/698.91 |

FOREIGN PATENT DOCUMENTS

| | | |
|---|---|---|
| BE | 1022742 B1 * | 8/2016 |
| DE | 4013071 A1 | 6/1991 |
| DK | 149424 B * | 6/1986 |
| EP | 1584432 B1 | 3/2007 |

(Continued)

OTHER PUBLICATIONS

EP 2944439 translation (Year: 2015).*

(Continued)

*Primary Examiner* — Jonathan G Riley
(74) *Attorney, Agent, or Firm* — CHRISTOPHER C. DREMANN, P.C.; Christopher C. Dremann

(57) ABSTRACT

A method for contour punching an output stack consisting of sheet-like material and a punching device for carrying out the method Includes providing at least two punching procedures. A large proportion of an unprinted region is separated from a printed region in a first punching procedure and a first punching waste produced thereby is collected separately, whereby the quantity of the second punching waste which is formed in a second punching procedure is significantly less than if only a single punching procedure were to be carried out. By collecting the first punching waste and the second punching waste separately, it is possible to provide this waste in each case for appropriate disposal or appropriate recycling.

10 Claims, 3 Drawing Sheets

(56) References Cited

FOREIGN PATENT DOCUMENTS

EP 2944439 A1 * 11/2015 ............... B26D 1/08

OTHER PUBLICATIONS

DK149424 B translation (Year: 1986).*
Europäisches Patentamt (European Patent Office), Europäischer Recherchenbericht (European Search Report), dated Jul. 30, 2021 (dated Jul. 30, 2021), 2 pages, European Patent Office, München, Germany (DE).

* cited by examiner

METHOD FOR CONTOUR PUNCHING AN OUTPUT STACK AND PUNCHING DEVICE

FIELD OF THE INVENTION

The present invention relates to a method for contour punching an output stack consisting of sheet-like material, in particular for punching out labels from an output stack consisting of sheet-like material. The invention further relates to a punching device for carrying out the method.

BACKGROUND OF THE INVENTION AND RELATED ART

The method according to the invention and the device according to the invention are used, in particular, for punching an output stack formed from a plurality of superimposed sheets provided with a printed label. The output stack consisting of sheet-like material comprises, in particular, printed paper. In certain cases the individual labels consist of plastics, in particular of a plastics film.

The output stack to be punched is, in particular, a pre-cut usable stack which has a cuboidal shape. In this regard, the method or the device serves to provide the pre-cut usable stack with its final contour. Thus, labels are generally printed on large printed paper sheets which are stacked one on top of the other in several 100 up to over 1000 paper sheets. Such printed paper sheet stacks are pre-cut longitudinally and transversely, wherein a plurality of pre-cut usable stacks which are subsequently separated are formed thereby. For the production of the finished labels, a contour punching blade having a closed contour, also denoted as a punching tool, is used. The punching takes place such that the stack to be punched is pressed against the contour punching blade, insofar as it is pressed into the contour punching blade, wherein punching waste is produced.

EP 1 584 432 B1 discloses such a method for contour punching an output stack consisting of sheet-like material and a punching device for carrying out the method.

When contour punching an output stack consisting of sheet-like material, in particular for producing labels, the problem occurs that the label to be punched out frequently has a shape deviating from a rectangle, thus a pre-cut cuboidal output stack, which is supplied to the punching device, has rectangular sheets or paper sheets with a relatively large unprinted region. In order to maintain a good result of the punched-out label, in particular in order to avoid unprinted edges on the punched-out label, it is generally necessary to punch out the label such that the contour punching blade penetrates the respective sheet or the output stack in the region of the printed region, such that the punched-out label is printed up to its outer contour. This leads to the problem, however, that the punching waste which is formed during the punching procedure has printed regions. The disposal and/or a recycling of waste which is printed is associated with greater costs or greater effort than in the case of waste without printed regions.

OBJECTS OF THE INVENTION

Accordingly, it is the object of the present invention to provide a method in which the quantity of printed punching waste may be reduced. It is also the object of the invention to provide a device for carrying out the method according to the invention.

These objects are achieved by a method which has the features described and shown herein, and a punching device which has the features described and shown herein.

SUMMARY OF THE INVENTION

The method according to the invention for contour punching an output stack consisting of sheet-like material, in particular for punching out labels from an output stack consisting of sheet-like material, has the following method steps:

- providing an output stack consisting of sheet-like material to be punched, wherein the respective sheet has a printed region and an unprinted region which preferably entirely encloses the printed region, wherein the printed region of the respective sheet has an outer contour,
- providing a first contour punching blade, also denoted as a punching tool, wherein a punching contour of the first contour punching blade is larger than the outer contour of the printed region,
- pressing or pushing the provided output stack into the first contour punching blade for forming a pre-punched stack, such that the first contour punching blade exclusively penetrates the output stack in the unprinted region, so that first punching waste which is formed in this first punching procedure is free of printed regions,
- collecting the first punching waste,
- providing a second contour punching blade, wherein a punching contour of the second contour punching blade is smaller than the outer contour of the printed region or corresponds to the outer contour of the printed region,
- pressing the pre-punched stack into the second contour punching blade for forming a usable stack, in particular for forming a stack of punched-out labels, such that the second contour punching blade cuts through the pre-punched stack in the printed region, in particular exclusively in the printed region, so that second punching waste which is formed in this second punching procedure has printed regions,
- collecting the second punching waste, wherein the second punching waste is collected separately from the first punching waste.

By providing at least two punching procedures, a large proportion of the unprinted region is separated from the printed region in the first punching procedure and the first punching waste produced thereby is collected separately, whereby the quantity of second punching waste which is formed in the second punching procedure is significantly less than if only a single punching procedure were to be carried out. By collecting the first punching waste and the second punching waste separately, it is possible to provide this waste in each case for appropriate disposal or appropriate recycling.

The output stack consisting of sheet-like material, in particular the respective sheet, preferably has a cuboidal shape. The output stack, in particular, may be a pre-cut output stack, wherein the output stack is pre-cut such that only a single closed printed region for each sheet of the pre-cut output stack is present on the respective sheet, in particular a single printed label is present for each sheet of the pre-cut output stack. The printed label in this case forms the printed region. It is quite conceivable that the printed region extends partially to the edge of the respective paper sheet. Preferably, the printed label has larger dimensions than the final label.

It is regarded as particularly advantageous if the pre-punched stack is pressed into the second contour punching blade by the output stack acting on the pre-punched stack when the output stack is pressed into the first contour punching blade. As a result, it is not necessary to handle the pre-punched stack separately. In particular, it is provided that guide structures are present between the first contour punching blade and the second contour punching blade, wherein these guide structures serve to guide the movement of the pre-punched stack when the pre-punched stack is pressed in the direction of the second contour punching blade.

The punching blade according to the invention serves for carrying out the method according to the invention. To this end, the punching device has a first contour punching blade with a punching contour, a second contour punching blade with a punching contour and a punching die which is movable in the direction of the first contour punching blade for pressing an output stack into the first contour punching blade. The dimensions of the punching contour of the first contour punching blade in this case are larger than the dimensions of the punching contour of the second contour punching blade. A pre-punched stack is formed when the first contour punching blade passes through the output stack. The device has a first collecting device for collecting the first punching waste which is formed when the first contour punching blade passes through the output stack. The second contour punching blade is arranged downstream of the first contour punching blade in the direction of movement of the punching die, so that the pre-punched stack is pressed into the second contour punching blade when the punching die is moved in the direction of the first contour punching blade. The device has a second collecting device for collecting the second punching waste which is formed when the second contour punching blade passes through the pre-punched stack. The first collecting device and the second collecting device in this case are not identical, so that the first punching waste and the second punching waste are collected separately from one another.

It is quite conceivable that the first and the second collecting devices are components of a common waste collection device, for example the collection devices are formed by different compartments of the waste collection device.

It is regarded as advantageous if a geometric shape of the punching contour of the first contour punching blade is able to be transferred by scaling into a geometric shape of the punching contour of the second contour punching blade, wherein a scaling factor is less than 1.

Preferably, both the geometric shape of the punching contour of the first contour punching blade and the geometric shape of the punching contour of the second contour punching blade at least substantially correspond to the geometric shape of the outer contour of the printed region.

It is regarded as particularly advantageous if the contour punching blades are arranged so as to be nested in one another.

Preferably, both the first contour punching blade and the second contour punching blade are configured to be substantially hollow cone-shaped. As a result, the second contour punching blade may be arranged inside the first contour punching blade.

The punching device has at least one diverting element for diverting the first punching waste into the first collecting device and/or for diverting the second punching waste into the second collecting device.

This diverting element, for example, may be a plate-shaped element, for example in the manner of a partition wall. It is quite conceivable and preferred if the diverting element extends between the two contour punching blades in the direction of the collecting devices.

It is regarded as particularly advantageous if the respective collecting device is arranged below the respective contour punching blade.

It is regarded as particularly advantageous if the first collecting device and/or the second collecting device is a waste container, in particular a rollable waste container. Preferably, the waste container is a commercially available refuse bin. In particular, the device has waste containers which may be handled separately from one another.

It is regarded as advantageous if the first contour punching blade and/or the second contour punching blade is displaceably and/or pivotably mounted in the punching device, in particular the contour punching blades are mounted so as to be displaceable relative to one another and/or pivotable relative to one another in the punching device. As a result, the first contour punching blade and/or the second contour punching blade may be altered in terms of the position thereof in a particularly simple manner, in particular in order to achieve an optimal orientation of the respective contour punching blade relative to the output stack or the pre-punched stack and/or the punching die.

It is regarded as particularly advantageous if the first contour punching blade and/or the second contour punching blade are mounted in a common bearing structure, wherein the bearing structure is pivotably and/or displaceably mounted in the punching device. As a result, it is possible to orientate the first contour punching blade and the second contour punching blade together, in particular relative to the output stack. In this connection, it is quite conceivable that the position and orientation of the first contour punching blade is unchangeable relative to the second contour punching blade.

It is also quite conceivable, however, that the first contour punching blade and/or the second contour punching blade is displaceably and/or pivotably mounted in the bearing structure.

It is regarded as particularly advantageous if the punching contour of the first contour punching blade and/or the punching contour of the second contour punching blade are configured as a closed contour.

BRIEF DESCRIPTION OF THE DRAWING FIGURES

The invention is described in more detail and illustrated in the accompanying drawing figures by means of an exemplary embodiment, without being limited thereto.

DETAILED DESCRIPTION OF THE INVENTION

Figure 1:
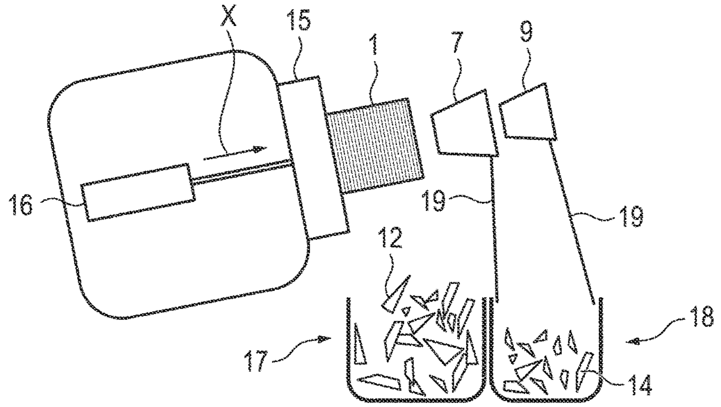
FIG. 1 shows a schematic view of an embodiment of a punching device according to the invention in a side view.
Figure 2:
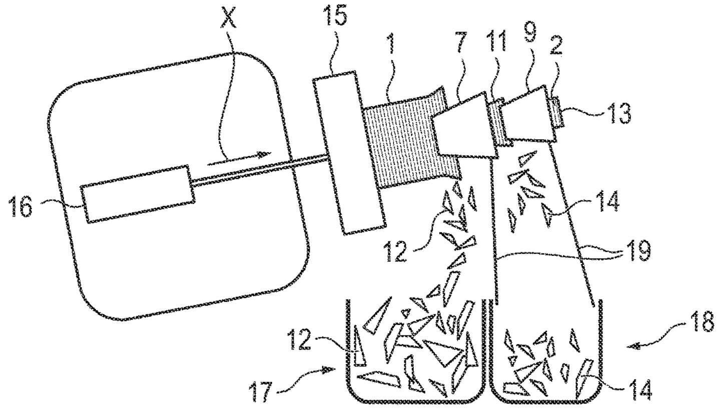
FIG. 2 shows the punching device according to FIG. 1 when carrying out the punching procedures.
Figure 4:
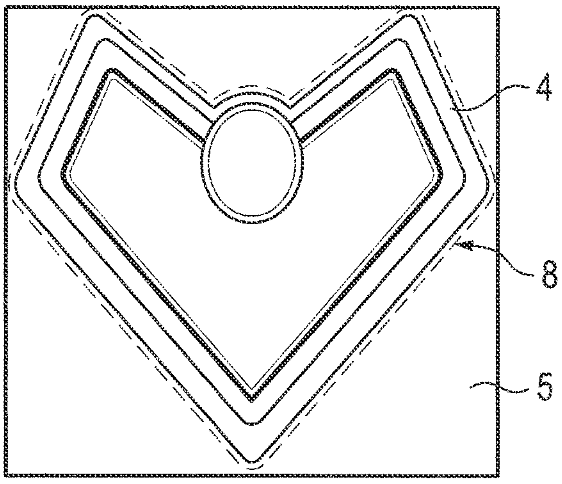
FIG. 4 shows the sheet according to FIG. 3 with an illustrated punching contour of a first punching blade.
Figure 6:
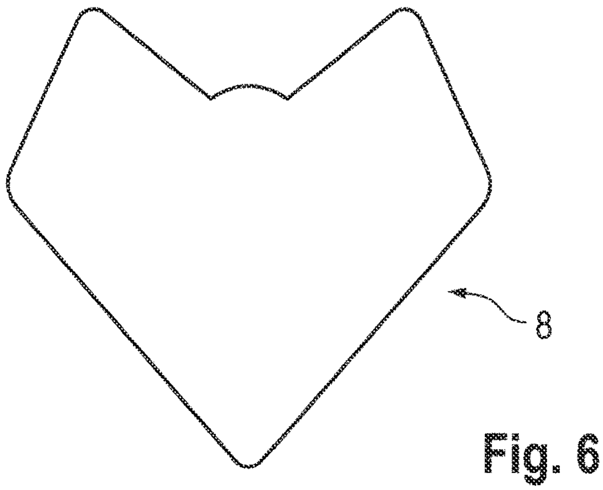
FIG. 6 shows a schematic view of the punching contour of the first contour punching blade.
Figure 7:
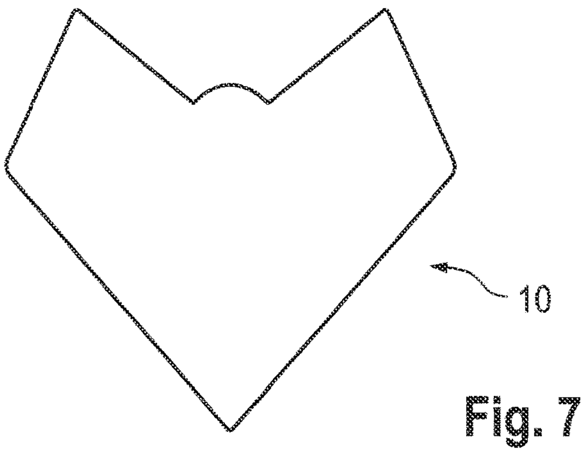
FIG. 7 shows a schematic view of the punching contour of a second contour punching blade.

FIGS. 1 and 2 show a punching device according to the invention, wherein the punching device has a first contour punching blade 7 with a punching contour 8 (FIG. 4; FIG. 6), a second contour punching blade 9 with a punching contour 10 (FIG. 7) and a punching die 15 which is displaceable in the direction of movement X. The punching die 15 is movable by means of the drive 16. The punching die 15 serves for pressing an output stack 1 into the first contour punching blade 7.

Figure 3:
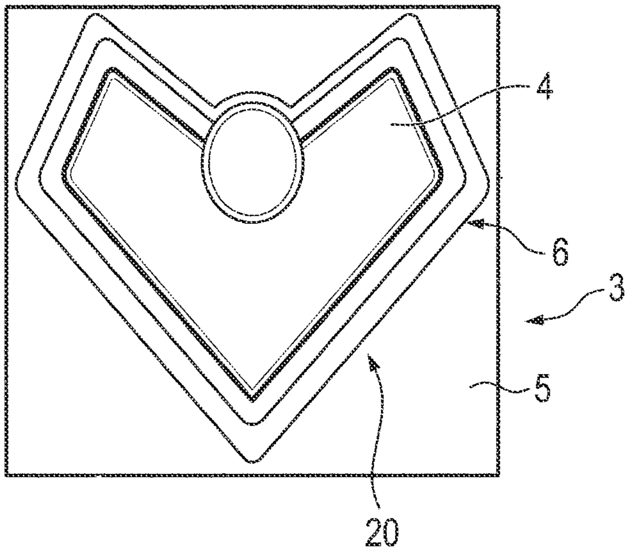
FIG. 3 shows a sheet of an output stack with a printed label in a plan view.

The output stack 1 is formed from a plurality of paper sheets, which are stacked one on top of the other, and is pre-cut such that it is cuboidal and a single printed label 20 (FIG. 3) is printed on the respective paper sheet. In this regard, the respective paper sheet or the respective sheet 3 (FIG. 3) has a printed region 4 (FIGS. 3-5), namely the printed label 20, and an unprinted region 5 (FIGS. 3-5) enclosing the printed region 4 over the periphery, wherein the printed region 4 has an outer contour 6 (FIG. 3). The printed label 20 has slightly larger dimensions than the final cut label 2 (FIG. 2). In the present case, the final cut label 2 is a label for the neck region of a bottle.

The punching contour 8 of the first contour punching blade 7 and the punching contour 10 of the second contour punching blade 9 in the present case are able to be moved approximately into one another by scaling, wherein the punching contour 8 of the first contour punching blade 7 is slightly larger than the outer contour 6 of the printed region 4 and the punching contour 10 of the second contour punching blade 9 is slightly smaller than the outer contour 6 of the printed region 4. The punching contour 10 of the second contour punching blade 9 corresponds to an outer contour of the final cut label 2.

During the punching procedure by means of the punching device according to FIG. 1, the output stack 1 is displaced by means of the punching die 15 in the direction of the first contour punching blade 7 and pressed into the contour punching blade 7 such that a pre-punched stack 11 (FIG. 2) is formed. The first punching waste 12 which is formed by this punching procedure is collected in a first collecting device 17 which is arranged below the first contour punching blade 7. During this first punching procedure, the first contour punching blade 7 penetrates the output stack 1 exclusively in the unprinted region 5 of the output stack 1 or the respective sheet 3, as is shown schematically in FIG. 4. In this regard, the first punching waste 12 which is formed in this first punching procedure is free of printed regions.

Figure 5:
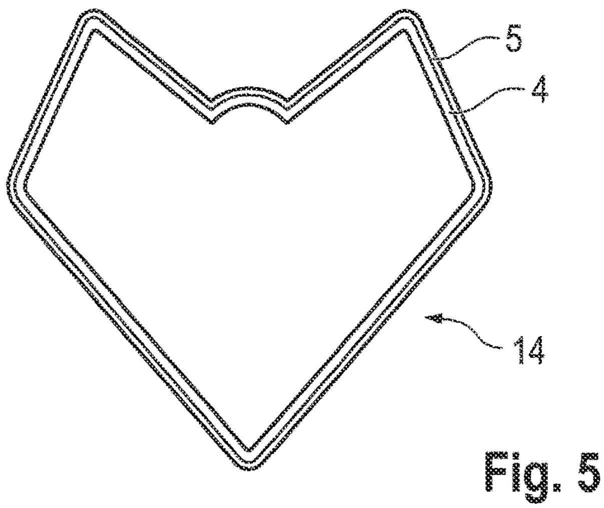
FIG. 5 shows a second punching waste produced in a second punching procedure.

The punching device is configured such that the pre-punched stack 11 is pressed into the second contour punching blade 9 by the output stack 1 acting on the pre-punched stack 11 and pressing this pre-punched stack 11 into the second contour punching blade 9 when the output stack 1 is pressed into the first contour punching blade 7 by means of the punching die 15. When the pre-punched stack 11 is pressed into the second contour punching blade 9 a usable stack 13 consisting of final cut labels 2 is formed. In this case, the second contour punching blade 9 penetrates the pre-punched stack 11 exclusively in the printed region 4, so that second punching waste 14 which is formed in this second punching procedure has printed regions 4 and unprinted regions 5. By way of example, this second punching waste 14 is shown for an individual sheet 3 in FIG. 5. The punching waste 14 shown in FIG. 5 is ring-shaped, with an inner printed region 4 and an unprinted region 5 enclosing the printed region 4 radially outwardly over the periphery.

The punching device has a second collecting device 18 for collecting the second punching waste 14 which is formed in the second punching procedure. In order to avoid the situation where the first punching waste 12 is mixed with the second punching waste 14 and in order to ensure that the punching waste 12, 14 which is formed is reliably supplied to the respective collecting device 17, 18, the punching device has two diverting elements 19, wherein one of the diverting elements 19 extends from the first contour punching blade 7 in the direction of the adjacent side walls of the collecting devices 17, 18 and the other diverting element 19 extends from the second contour punching blade 9 in the direction of a side wall of the second collecting device 18 opposing the adjacent side wall. In this punching device it is thus ensured that exclusively unprinted first punching waste 12 is collected in the first collecting device 17, said first punching waste 12 being able to be disposed of separately from the at least partially printed second punching waste 14 which is collected in the second collecting device 18. Thus, the costs for the waste disposal may be reduced, since typically the costs for the disposal of printed material are greater than for the disposal of unprinted material. The unprinted material may be resold as recyclable material. As a result, money may be saved overall by separating the printed and unprinted waste material.

That which is claimed is:

1. A method for contour punching an output stack consisting of sheet-like material comprising:
- providing the output stack consisting of the sheet-like material to be punched, wherein a respective sheet of the output stack has a printed region and an unprinted region which encloses the printed region, wherein the printed region has an outer contour;
- providing a first contour punching blade, wherein a first punching contour of the first contour punching blade is larger than the outer contour of the printed region;
- pressing the output stack into the first contour punching blade for forming a pre-punched stack, such that the first contour punching blade penetrates the output stack exclusively in the unprinted region, so that a first punching waste of the output stack formed in a first punching procedure is free of the printed region;
- collecting the first punching waste;
- providing a second contour punching blade, wherein a second punching contour of the second contour punching blade is smaller than the outer contour of the printed region or corresponds to the outer contour of the printed region;
- pressing the pre-punched stack into the second contour punching blade for forming a usable stack, such that the second contour punching blade cuts through the pre-punched stack in the printed region so that a second punching waste of the pre-punched stack formed in a second punching procedure has a portion of the unprinted region and a portion of the printed region; and
- collecting the second punching waste separately from the first punching waste.

2. The method according to claim 1, wherein the pre-punched stack is pressed into the second contour punching blade by the output stack acting on the pre-punched stack when the output stack is pressed into the first contour punching blade.

3. A punching device comprising a first contour punching blade with a first punching contour, a second contour punching blade with a second punching contour, wherein the dimensions of the first punching contour of the first contour punching blade are larger than the dimensions of the second punching contour of the second contour punching blade, wherein the punching device has a punching die which is movable in a direction of movement towards the first contour punching blade for pressing an output stack into the first contour punching blade for forming a pre-punched stack when the first contour punching blade passes through the output stack, wherein the punching device has a first collecting device for collecting a first punching waste of the output stack formed when the first contour punching blade passes through the output stack, wherein the pre-punched stack is pressed into the second contour punching blade when the punching die is moved in the direction of movement towards the first contour punching blade, wherein the punching device has a second collecting device for collecting a second punching waste of the pre-punched stack formed when the second contour punching blade passes through the pre-punched stack, and wherein the first collecting device and the second collecting device are separate.

4. The punching device according to claim 3, wherein a geometric shape of the first punching contour of the first contour punching blade is transferred by scaling into a geometric shape of the second punching contour of the second contour punching blade, and wherein a corresponding scaling factor is less than 1.

5. The punching device according to claim 3, wherein the punching device further has a drive for moving the punching die in the direction of movement towards the first contour punching blade.

6. The punching device according to claim 3, wherein the second contour punching blade is arranged downstream of the first contour punching blade in the direction of movement of the punching die.

7. The punching device according to claim 3, wherein the punching device further has at least one diverting element for diverting the first punching waste into the first collecting device and/or for diverting the second punching waste into the second collecting device.

8. The punching device according to claim 3, wherein the first collecting device and/or the second collecting device are/is a waste container.

9. The punching device according to claim 3, wherein the first punching contour of the first contour punching blade and/or the second punching contour of the second contour punching blade are/is configured as a closed contour.

10. The punching device according to claim 3, wherein the first punching waste has an unprinted region and is free of a printed region of a respective sheet of the output stack, and wherein the second punching waste has a portion of the unprinted region and a portion of the printed region.

* * * * *